US006674082B1

(12) United States Patent
Gunn

(10) Patent No.: US 6,674,082 B1
(45) Date of Patent: Jan. 6, 2004

(54) MONITORING EMISSIONS

(75) Inventor: Richard Donald Gunn, Seascale (GB)

(73) Assignee: British Nuclear Fuels PLC (GB)

( * ) Notice: Subject to any disclaimer, the term of this patent is extended or adjusted under 35 U.S.C. 154(b) by 0 days.

(21) Appl. No.: 09/700,526

(22) PCT Filed: May 12, 1999

(86) PCT No.: PCT/GB99/01269

§ 371 (c)(1),
(2), (4) Date: Feb. 15, 2001

(87) PCT Pub. No.: WO99/60420

PCT Pub. Date: Nov. 25, 1999

(30) Foreign Application Priority Data

May 15, 1998 (GB) ............................................... 9810434

(51) Int. Cl.$^7$ ................................................ G01T 7/00

(52) U.S. Cl. .................. 250/363.01; 250/364; 250/365; 250/363.03

(58) Field of Search ........................... 250/363.01, 364, 250/365, 363.03

(56) References Cited

U.S. PATENT DOCUMENTS 4,368,390 A * 1/1983 Takahashi et al. ..... 250/363.01

FOREIGN PATENT DOCUMENTS

| EP | 0542561 A1 | 5/1993 |
| WO | WO 97/37244 | 10/1997 |

OTHER PUBLICATIONS

Koster et al., Alpha Detection as a Probe for Counter Proliferation, Oct. 12, 1994, IEEE.

Grün et al., "Die Untersuchung von Energieaustausch– und Löschprozessen in Gasen durch Anregung mit schnellen Teilchen", (1954) A E Grun & E Schopper, vol. 9, pp. 134–147.

Gaydon, "The Band Spectrum of $N_2$: Weak Systems In The VisibleRegion", Sep., 1943, Chem Eng. Dept, Imperial College, London SW7, Proc. Phys. Soc., vol. 56, pp 85–95.

Grün, "Die Fluoreszenz von Gasen bei der Abbremsung schneller Teilchen", (1954) Naturforsch vol. 9a, pp. 55–63.

Grün, "On the Fluorescence of Air, Excited by Fast Electrons: Light Yield As A Function of Pressure", (1958) Canad. J. Phys. Vol. 36, pp. 858–862.

Koch, Étude Spectral de law Luminescence due a L'Excitation des Gaz Rares Par Les Rayons, (1960) Le Journal de Phys. Et le Radium, vol 21, pp. 169–173.

Huggins, et al., "Further Observations on the Spectrum of the Spontaneous Luminous Radiation of Radium at Ordinary Temperatures", (Oct. 1903) Roy. Soc. Proc., vol. 72, pt. 196, pp. 409–413.

(List continued on next page.)

Primary Examiner—Constantine Hannaher
Assistant Examiner—Otilia Gabor
(74) Attorney, Agent, or Firm—Beyer Weaver & Thomas LLP

(57) ABSTRACT

The method and apparatus provide a technique for monitoring radioactive source emissions by detecting photons arising from scintillation within the environment of the area or item under monitoring, caused by the passage of emissions from the radioactive source. The technique includes options for excluding ambient light photons through suitable shielding and/or selective in detection of photons from only certain wavelengths or wavebands. The technique enables levels/types and locations of emissions sources to be determined. The technique is applicable to environmental monitoring instruments, scanning instruments and other types.

16 Claims, 3 Drawing Sheets

OTHER PUBLICATIONS

Koch, "Noveau compteur `` scintillation à très faible temps de résolution", 1961) Acta Elect., vol. 5, No. 1, pp. 103–110.

Platzman, "Total Ionization in Gases by High–energy Particles: An Appraisal of Our Understanding", (1961) Int'l J. Appl. Radn. Isotopes vol. 10, pp. 116–127.

Stern et al., "Über die Abklingungszeit der Fluoreszenz", (1919) Pysik Z. vol. XX, pp. 183–188.

Ward, "The Emission of Light in the Passage of Alpha Particles through Gases", (1954) Proc. Phys. Soc., vol. A67, pp. 841–846.

Duquesne et al., "Physique Corpusculaire", (Jan. 1961) Acad. Sci. Paris. vol. 252, pp. 102–103.

Duquesne et al., "Mesure de la Luminescence Induite Par le Rayonnement . . . ", (Oct. 1960) Le Jrnl de Phys. et le Radium, vol. 21, pp. 708–716 (w/translation).

Sou et al., "High performance ZnSTe photovoltaic visible–blind ultraviolet detectors", (1997), Appl. Phys.Lett. vol. 71 (26), pp. 3847–3849.

Huggins et al., "On the Spectrum of the spontaneous Luminous Radiation of Radium", (Dec. 1905) Roy. Soc. Proc., vol. 77, pp. 130–131.

Schmidt, "Abklingung und Mechanismus der Lumineszenz von Gasen bei Anregung durch schnelle Elektronen", (Oct. 1956) Aus. Dem Physik. Instit., pp. 1023–1030.

Grün et al., "Über die Fluoreszenz von Gasen bei Anregung durch a–Teilchen", (1951) Z. Naturforsch, vol. 6a pp. 698–700.

Grimm et al., "Fast Decay Components in the Scintillation Gases Ar, Ar–$N_2$, Xe, And He–Xe Excited by Heavy–ION Impact", (1987) Nucl. Instrum. & Meth. A262, pp. 395–402.

Mutterer et al., "A Multiparameter Gas–Scintillation Counter For Heavy Charged Particles", (1980) IEEE Trans. Nucl. Sci., Vol. NS–27 (1), pp. 184–189.

Le Goaller et al., "Onsite Nuclear Video Imaging", (Aug. 2000) Comm. A l'Energie Atom., Rhone Vly Resrch Ctr, pp. 1–7.

Mutterer, "Gas Scintillation Nuclear Particle Detectors", (1982) Nucl. Instrum. & Methods vol. 196, pp. 73–81.

Birks, "The Theory and Practice of Scintillation Counting", Int'l Series of Monographs on Elect. & Instrum., vol. 27, ch.14, pp. 570–614.

Knoll, "General Properties of Radiation Detectors", Sec. VI Detection Efficiency, (1989) Wiley, Radiation Detection & Measurement, pp. 117–120 and 239–240.

"UV Index Definition", http://www.woudc.ec.gc.ca/e/ozone/uv_index_definition.htm, p. 1 of 2, printed from the World Wide Web Nov. 18, 2002.

* cited by examiner

MONITORING EMISSIONS

This invention concerns improvements in and relating to monitoring emissions, and in particular, but not exclusively to the monitoring of positions and/or levels and/or changes in emissions from radioactive sources.

Alpha particles, for instance, are emitted from a variety of radioactive sources. The determination of the presence, level and position of alpha emitting sources is important in many applications, including decommissioning. Alpha particles only travel a few centimetres in air and as a consequence their direct detection at any great distance is not possible.

Some existing instruments, for alpha emission monitoring, generally call for the instrument to be placed in close proximity to the surface to be measured. This can be difficult for some surfaces and is time consuming when any significant size of area is under consideration.

Alternative instruments, for alpha emission monitoring, require a flow of air from in proximity with the source(s) to a detection unit, where ions produced by the alpha particles are measured. This type of system is restricted to situations in which a controlled flow path can be provided. The distance over which this type of remote monitoring can be provided is also restricted.

Monitoring of other emissions, such as beta particles, gamma rays, neutrons, fission fragments, positrons and n-alpha's, also face problems. In many cases the distances over which monitoring can be effected are limited and physical access to the source is required.

Problems also occur with monitoring as the environment under consideration is likely to have an ambient light level and/or may be heavily shielded relative to locations from which monitoring can be performed.

The present invention aims to provide a method of, and apparatus for, monitoring emissions successfully, particularly with a view to determining their location and/or level and/or to determine changes in emissions. This monitoring may be achieved from a significant distance from the emission source.

According to a first aspect of the invention we provide a method of monitoring emissions from one or more radioactive sources in an area, comprising the steps of presenting photon detecting means to the area to be monitored, the photon detecting means producing a signal indicative of photons detected, the signal being processed to produce an indication of the emissions from the radioactive source.

The emissions may arise from one or more sources. The sources may occur discreetly or as a non-discrete mass. Alpha emitting sources may include plutonium, uranium, americium and the like. Beta and/or gamma emitting sources may include caesium-137 and cobalt-60. Sources may also include materials or locations which give out emissions in response to an input, for instance an interrogating beam of neutrons. The source may not emit in the absence of the input. The emissions may give an indication of the presence of and/or position of and/or level of fissile material and/or the presence of and/or position of and/or the level material which can react by the (n,α) mechanism, such as boron or lithium at the location in such a case.

The photons preferably arise from scintillation caused by the emissions. The scintillation is preferably caused by the electronic de-excitation of atoms and/or molecules and/or ions within the environment from an elevated energy level to a lower energy level. Preferably the elevated energy level is caused by the passage of alpha particles and/or beta particles and/or gamma rays and/or fission fragments and the like.

The photon detecting means may be presented to the area by moving the detecting means.

The detecting means may be moved by changing the position of the unit on which they are provided. The unit may be moved by advancing the unit over a surface of the environment in which the unit is provided. The moveable unit may be remote controlled, for instance in terms of its position.

The detecting means may be moved by altering the angle of inclination of the detecting means relative to the horizontal and/or by altering the angular position of the detecting means about the vertical. The detecting means may be moved by a pan and tilt style mounting. The detector means may be remotely controlled, for instance in terms of its inclination or angular position.

The detecting means may be hand-held and/or may be moved by the hand of the operator.

The photon detecting means may be presented to the area by moving the area relative to the detecting means. The area may be provided on a moving belt or other form of transport means. The transport means may be used to move item(s) and/or material to be monitored past the detecting means, thereby presenting different areas to the detecting means.

The detecting means may be provided at a location to which discrete items are introduced and removed. The detecting means may be provided in one configuration to allow access to the location and a different configuration to allow monitoring. The detecting means may enclose the location during monitoring. The detecting means may be partially removed to allow access to the location.

The detecting means may be provided in a fixed position relative to the area. The detecting means may be provided above the area to be monitored.

The detector means may be presented to the area at a location remote from the area, photons being conveyed to the remote location. The photons may be conveyed by fibre optics.

The photons detected may consist of those travelling directly from the place of scintillation to the detector means. A method of, or means for, directing other photons to the detecting means may be provided. Mirrors, including planar and/or focussing mirrors may be provided to reflect other photons to the detector means.

The area to be monitored may be or be a portion of an environment. The area may overlap with other areas previously or subsequently monitored by the same method by the same instrument. The area may overlap with areas previously, simultaneously or subsequently monitored by one or more other instruments applying the same method.

The method may include scanning, for instance by moving the detecting means, so as to monitor a plurality of areas within the environment. Scanning may be provided by moving means for conveying photons to the detecting means, for instance the fibre optics. The detecting means may remain in a fixed position during such a scan. The fibre optics or a portion thereof may be moveable, preferably in a controlled manner such as that provided by an endoscope.

The photons may pass through a shield transparent to at least a part of the wavelengths of the photons prior to reaching the detecting means. The shield may block the passage of radiation, or at least a significant portion thereof.

The whole of an environment may be monitored from a single position and/or a number of different positions.

The photon may be detected by a light sensitive device such as photomultiplier, and most preferably an ultra violet light sensitive device and/or a solar blind photomultiplier. The light sensitive device may be collimated.

The photons to be detected and/or the photons to be considered may be selected from one or more emitted wavelengths or ranges thereof. The wavelengths detected and/or considered may be below 400 nm, more preferably below 350 nm and ideally below 325 nm. The range of wavelengths detected and/or considered may be indicative of scintillation from a particular component of the environment around the area, for instance nitrogen in the air around the surface carrying the source. The range of wavelengths may represent only some of the scintillations from that component. The selected range of wavelengths may be 220 to 320 for nitrogen. Preferably the selected waveband is one not containing a significant number of photons arising from the ambient light conditions for the area. The ambient light may be daylight and/or artificial light.

Ambient light may substantially or completely be excluded from the area. The instrument and/or light shields may be used to exclude ambient light from the area.

An environment may be a room, tank, vessel, cell, container, glove box, pipe, duct or the like. The interior and/or exterior surfaces may be investigated. The area may comprise the whole of an environment, such as in the case of the interior of a pipe, or may comprise a portion thereof, such as a floor, part of a floor or the like.

An area may be defined as the field of view of the detecting means. The field of view may be defined as the space in which scintillating sources will be observed. The field of view may be a cone shaped space, parabolic cone or Fresnel screen. The apex angle of the cone may be defined by the collimation of the photon detecting means.

The signal preferably includes information directly related to the number of photons detected.

The signal may include information from a range finder about the distance between the detector and one or more locations within the environment, particularly within the field of view of the detector.

The signal may be conveyed to the processing directly, for instance through wire(s), or may be relayed indirectly, for instance as a radio signal.

The processing preferably converts the detected photons into an indication of emissions. The processing may equate or calculate the emission level from pre-determined information about level as a function of photons detected, and particularly the level of photons detected. The indication of emissions may relate to the type of source causing the emissions. The processing may provide a level of alpha emissions and/or beta emissions and/or gamma emissions and/or other emission types singularly and/or may provide a level of overall emissions.

The processing may involve the subtraction of background scintillation from the signal. A second detecting means, receiving background only scintillations, may be used to provide the subtraction signal.

The processing may generate positional information about the source of the signals, for instance three dimensional co-ordinates for the field of view may be generated from the two angle and range signals for the detecting means.

The indication, for instance of the alpha emissions, may include one or more of, the total emission level, the emission level of distinct sources and/or areas, the direction of the emission source(s), the distance of the emission source(s) from the detector(s), the position of the emission source(s) relative to the detector(s) and/or relative to the environment the source(s) is in, such as the boundaries of a room.

The indication may express the level of one or more, and preferably each, discrete source found within the environment monitored or areas thereof. The indication may express the overall contamination level of the environment monitored or areas thereof.

The position may be expressed as three-dimensional co-ordinates relative to the environment the source(s) are in. The co-ordinates may be referenced relative to a corner of the environment, such as a corner between floor and two walls. The position may be expressed as an angle, more preferably 2 angles, relative to the detector and a distance between the detector and the source(s).

Positional and level information may be combined in the indication. The indication may comprise one or more 2-D slices or views and/or 3-D representations of the environment or areas thereof together with level indications. Contour plots of the contamination may be provided.

The emission information may be overlaid on a visual image of the area, the areas environment or both. The visual image may be taken from close to the detector means viewpoint.

According to a second aspect of the invention we provide an emission monitoring instrument comprising photon detection means and processing means, the photon detecting means producing a signal in response to photons, the processing means acting on the signal to give an indication relating to the emissions.

The photons preferably arise from scintillation caused by the passage of alpha particles and/or beta particles and/or gamma rays and/or other emission types.

The photon detecting means may be moveable and/or portable.

The detecting means may be mounted on a moveable unit on which they are provided. The moveable unit may be remote controlled, for instance in terms of its position.

The detecting means may be mounted on an inclinable and/or rotatable element. The detecting means may be mounted on a pan and tilt style mounting. The detector means may be remotely controlled, for instance in terms of its inclination or angular position.

The detecting means may be hand-held.

The instrument may comprise a moving belt or other form of transport means. The transport means may be used to move item(s) and/or material to be monitored past the detecting means.

The instrument may comprise a moveable element carrying one or more detecting means. The moveable element may be provided in one configuration to allow monitoring.

The instrument may comprise one or more detecting means provided in a fixed position relative to the area to be monitored. The detecting means may be provided above the area to be monitored. The detecting means may be provided within an item having an area to be monitored, for instance inside a pipe.

The photon detection means may comprise a light sensitive device, such as a photomultiplier. The light sensitive device may be collimated.

The photon detecting means may be selective to a certain wavelengths as detailed in the first aspect of the invention, and/or elsewhere in this document. Preferably the selective waveband is one not containing a significant number of photons under the ambient light conditions for the area. The ambient light may be daylight and/or artificial light. Light may substantially or completely be excluded from the area, for instance, by the instrument.

The instrument may include a range finder, preferably to indicate the distance between the detector and one or more locations within the environment, particularly within the field of view of the detector.

The detecting means may be connected to the processing means directly, for instance through wire(s), or may be indirectly connected, for instance via a radio transmitter.

Preferably the instrument measures emission level. Preferably the instrument measures the position of the source of the signals, for instance as three dimensional co-ordinates.

The instrument may monitor, for instance in relation to alpha emissions, the emissions in terms of one or more of, the total emission level, the emission level of distinct sources and/or areas, the direction of the emission source(s), the distance of the emission source(s) from the detector(s), the position of the emission source(s) relative to the detector (s) and/or relative to the environment the source(s) is in, such as the boundaries of a room.

The indication may express the level of one or more, and preferably each, discrete source found within the environment monitored or areas thereof. The indication may express the overall contamination level of the environment monitored or areas thereof.

The position may be expressed as three-dimensional co-ordinates relative to the environment the source(s) are in. The co-ordinates may be referenced relative to a corner of the environment, such as a corner between floor and two walls. The position may be expressed as an angle, more preferably 2 angles, relative to the detector and a distance between the detector and the source(s).

Positional and level information may be combined in the indication. The indication may comprise one or more 2-D slices or views and/or 3-D representations of the environment or areas thereof together with alpha level indications. Contour plots of the contamination may be provided.

Various embodiments of the invention will now be described, by way of example only, and with reference to the accompanying drawings, in which.

Whilst the techniques described below are demonstrated principally with reference to alpha emissions they are equally applicable to beta emissions and other radioactive or radioactive sourced emissions.

With alpha particles, as they only travel a few centimeterss in air from their location of emission their direct measurement requires the presentation of an instrument within that range. This may be problematical where the surface is hard to access, for instance the inside of a vessel or a recess, and in any event is time consuming as the instrument must be positioned at such a distance from all parts of the surface to be monitored.

Other systems are known where the ions produced by the passage of alpha particles during their short path are removed from their location of formation to a remote monitoring location. This technique calls for a flow or air from the source location to the monitoring location. The technique is effective, but limited to situations were the provision of such a flow path is viable. The technique is also limited by the recombination of the ions over time and distance, thereby reducing the signal, and so is only effective for distances of 20 meter or so.

Because of these limitations on prior art instruments a more versatile system is desirable.

Figure 1:
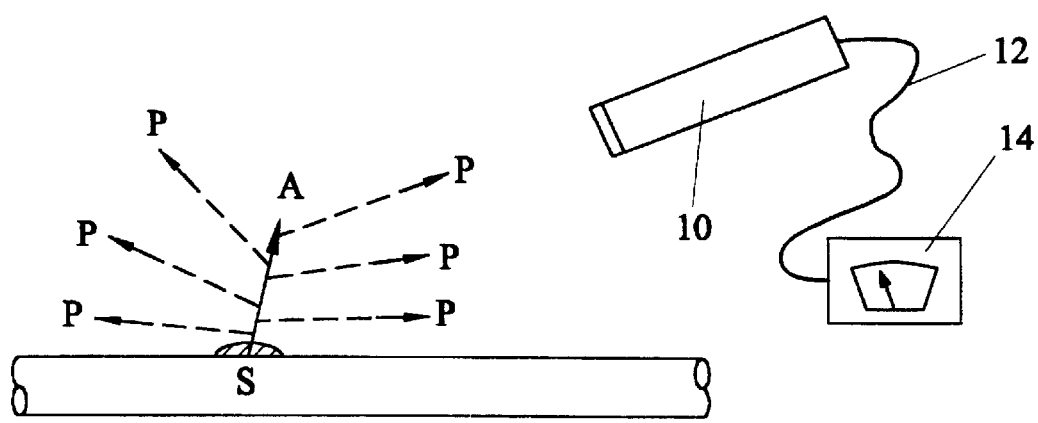
FIG. 1 illustrates a first embodiment of the present invention.

As illustrated in FIG. 1, an alpha particles A after emission for a source S travels a few centimeterss in air. During its travel collisions of the alpha particle A with air molecules give rise to certain interactions. In the case of nitrogen molecules, in particular, the alpha particle A causes excitation. In decaying to their ground state the nitrogen molecules scintillate during the transition back from their two lowest excitation states to produce photons P. The precise nature of this scintillation produces characteristic emission in the ultraviolet range. Nitrogen scintillation in this way gives scintillation across a range of wavelengths. The proportions are approximately 20% in the 220 nm to 320 nm range, 60% in the 320 nm to 390 nm range and 20%. in the 390 nm to 520 nm range. Approximately 1000 photons are generated per alpha particle, but dependant on pressure and a number of other factors.

Through the use of a suitable photomultiplier 10 some of the photons P are detected and converted into a signal 12 which is fed to processing means 14. The signal level is indicative of the number of photons detected and hence the level of contamination encountered.

The instrument illustrated in FIG. 1 may be separated from the source in practice by a radiological shield. The shield is provided with a shielding, but optically transparent window for visual inspections. The shield merely needs to be transparent to some of the wavelengths of scintillation occurring for the technique to function. The detection of non-ambient light wavelengths and/or the exclusion of ambient light is preferred.

The scintillation effect can be employed through a variety of manners to give effective monitoring instruments.

Figure 2:
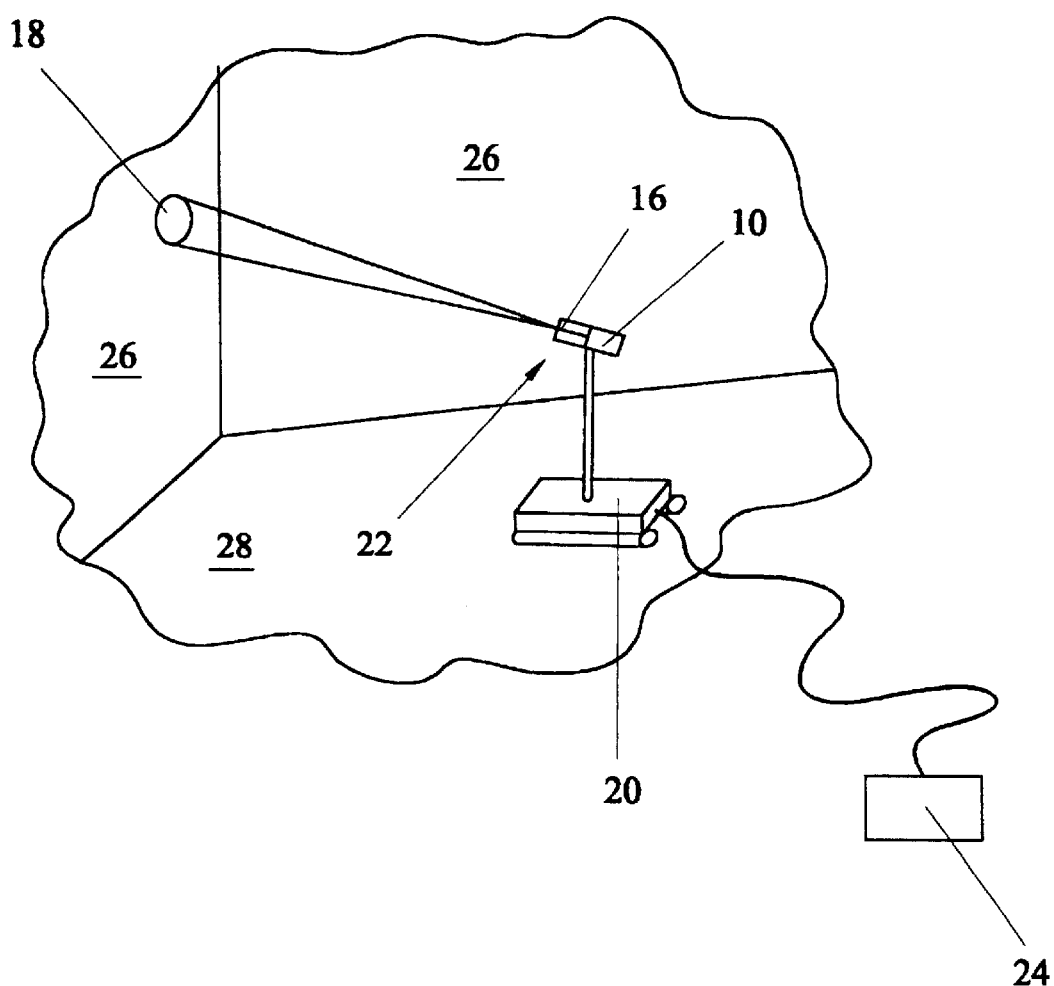
FIG. 2 illustrates a second embodiment of the present invention.

As illustrated in FIG. 2 the technique can be configured to provided a precise survey instrument. To provide directional sensitivity the photomultiplier 10 is collimated 16, giving a restricted field of view 18. Only photons originating in the field of view 18 reach the photomultiplier 10 and as such the signal obtained relates directly to alpha sources in that restricted field of view.

By mounting the photometer on a mobile base 20, providing a tilt and turn head 22 and controlling the system through control unit 24 the instrument can be used to survey any part of its surrounding environment, such as walls 26 or floor 28. An instrument such as this can be used in investigating unknown contamination within locations, decommissioning planning or clean-up operations.

Figure 3:
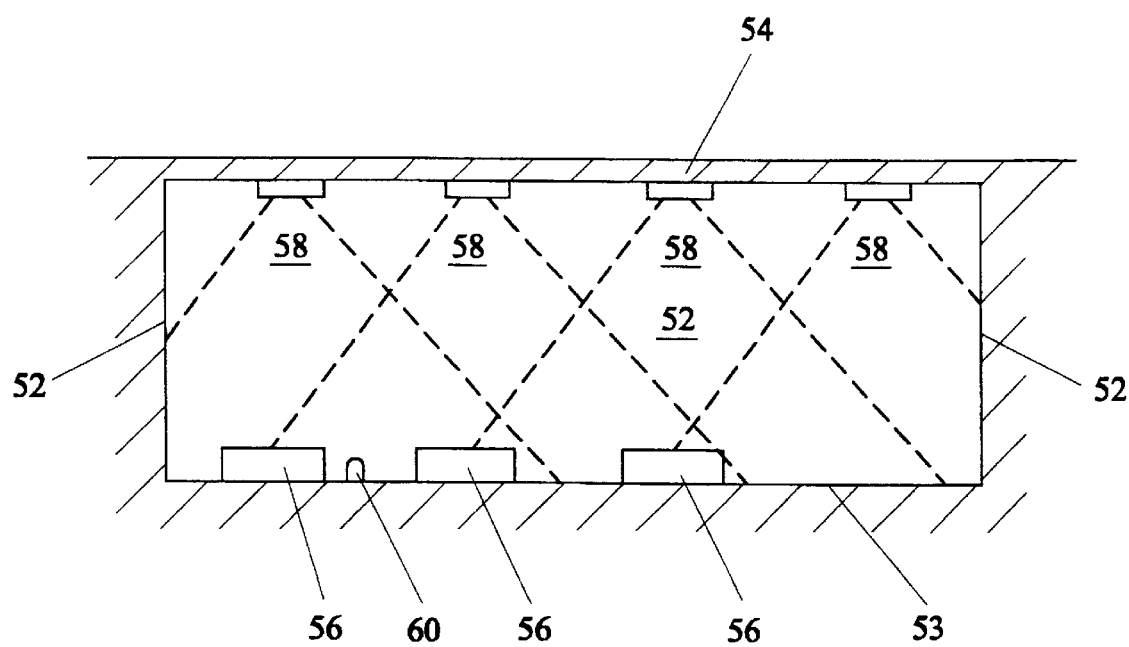
FIG. 3 illustrates a third embodiment of the present invention.

In the embodiment illustrated in FIG. 3 the instrument type is deployed in a different form and configuration. In this case a series of detectors 50 are positioned at a number of different locations around a room formed of walls 52, floors 53, and ceilings 54, and its associated equipment, glove boxes 56, which are to be monitored. The detectors 50 are not collimated to a narrow angle but rather provide a series of overlapping monitoring views 58 for the room and equipment. The deployment of the detectors 50 is intended to give minimal blind spots to the detectors 50.

The occurrence of an alpha emitting source 60 within the room is detected by one or more of the detectors due to the nitrogen scintillation.

Detection of this type can be used to monitor areas during plant operation, for instance to provide a warning signal to the site operator at a centralised control room, at which point further action can be taken. Equally the system can be used to monitor areas during non-operational phases, such as during care and maintenance phases and/or during surveillance phases. Again detection of emissions, or a significant changes in emissions, may be followed by further action. The further action might include investigating the room with a directionally sensitive instrument of the type provided by this invention.

Figure 4:
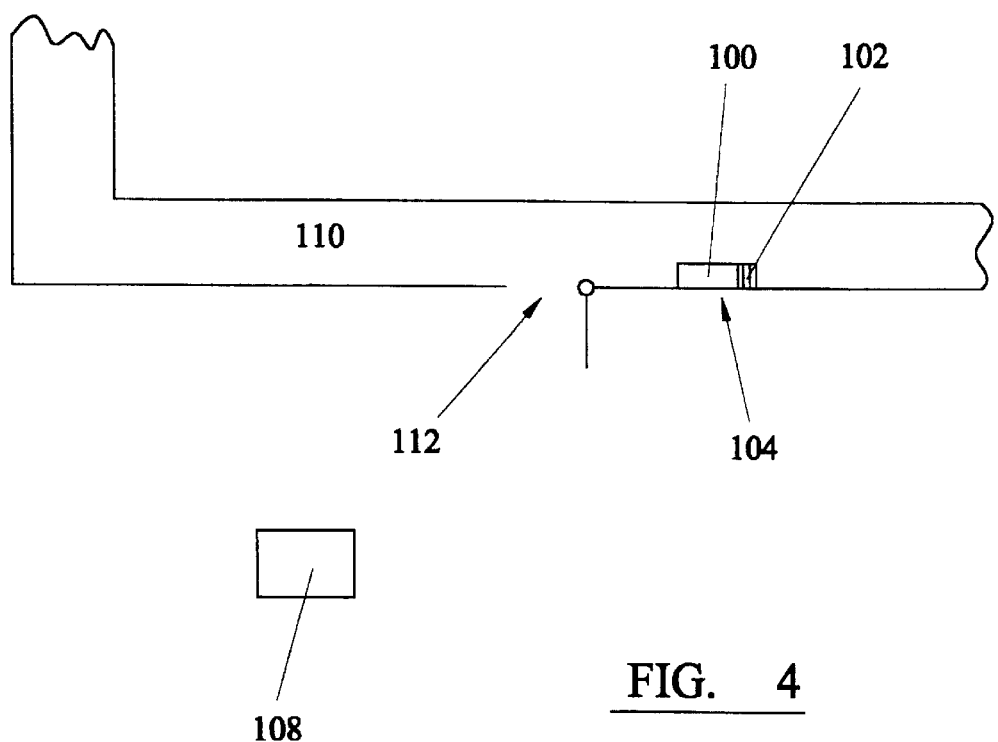
FIG. 4 illustrates a fourth embodiment of the present invention.

The inventions technique is also suitable for inclusion in an instrument used to examine inaccessible locations, such as corners, ventilation ducts or the interior of pipes. As exemplified in FIG. 4 the photomultiplier 100 is collimated 102 and provided in a unit 104 which is deployed in-situ within the ventilation duct 110. Signals from the unit 104 are conveyed to processing and recording unit 108 at a remote location. The small size and range of directional and position control possible for the instrument make it versatile and easy to use. In the illustrated form the unit 104 is inserted into a ventilation duct 110 through a small access aperture 112 which is too small for conventional instrument access.

Whilst the invention may be used in a mode hereby the principal wavelength range of the scintillations is used for detection, other non-predominating scintillation wavebands may be used for the detection. These bandwidths use may be advantageous. For instance, nitrogen scintillates across the wavelengths 220 nm to 520 nm, with 80%. of the scintillation generated photons having wavelengths of over 320 nm. This range corresponds to photons present in normal sunlight and/or artificial lighting. As a consequence photons from the ambient light would also be detected and cause errors in the results.

Figure 5:
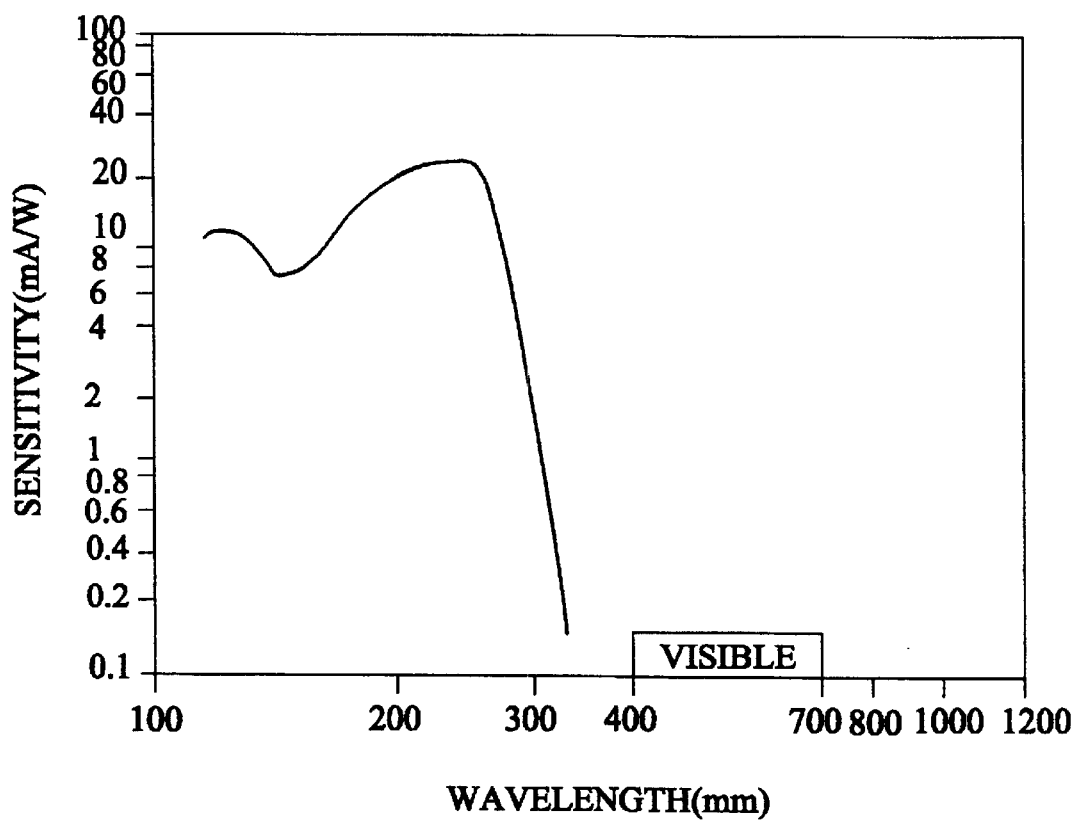
FIG. 5 illustrates the sensitivity of a solar blind photomultiplier with incident wavelength.

Whilst it is possible in some case, for instance the inside of a pipe to exclude ambient light, to do so in many cases would be time consuming and expensive, if indeed it were possible. This problem can be solved, however, if a waveband in which substantially no photons of normal light are present is employed for the detection purposes with other photons not contributing. To achieve this a photomultiplier or other UV sensitive device tailored to this waveband so as to suffer from minimal interference from surrounding ambient light conditions must be provided. The sensitivity for such a photomultiplier with wavelength is illustrated in FIG. 5.

In the case of nitrogen scintillations where wavelengths of less than 320 nm are considered then less than 20 counts per second from non-desired photons are encountered, using the above mentioned photomultiplier. By using this detection technique the instrument can successfully operate in the presence of ambient light and/or it is possible to provide a visible light direction indicator on the instrument.

A two (or more) channel device may be used to enable a correction to be applied to the nitrogen emission signal for contributions arising from ambient light/UV.

The indicator, which could take the form of a torch beam, gives a visual indication of the field of view which coincides with the field of view of the photomultiplier.

As well as an instrument which is moved relative to the location to be monitored, the technique can be used in systems where the items move. Thus the photomultipliers can be positioned in a tunnel structure through which the material or items to be monitored pass.

The items can be discretely presented, for instance beams, tools or the like, on a supporting belt. The belt is preferably provided in the form of a grid so as to maximise the surface area of the item which is exposed and from which scintillation events can arise as a result. Scintillations are detected by an array of photomultipliers around the belt.

The instrument can also be used over a belt carrying a continuous feed of material, such as soil, rubble or powder.

Other possible embodiments include the use of the technique for a personnel monitor to ensure non-contamination, by the user entering an area substantially surrounded by photometers. Any alpha sources present on the users clothing will be detected due to the scintillation. A similar configuration can be used to monitor surface contamination on containers, such as those used for transporting nuclear fuel, by presenting them to a location surrounded by photomultipliers.

Figure 6:
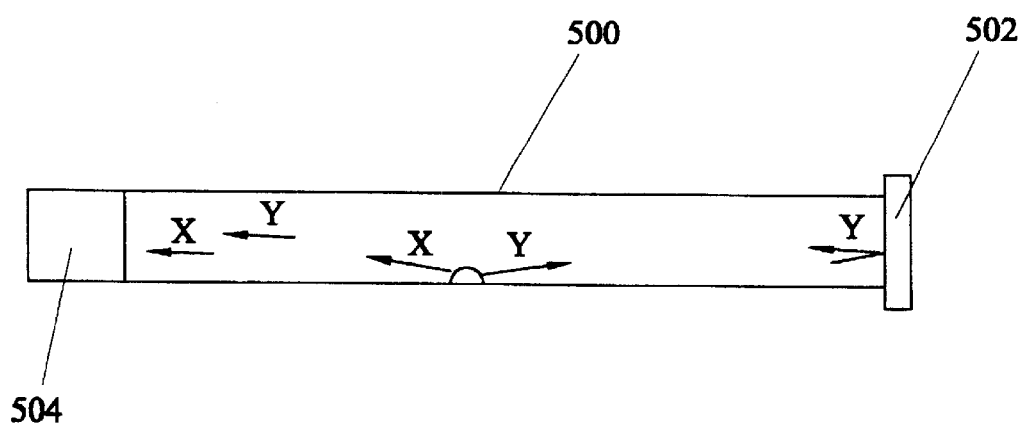
FIG. 6 shows a fifth embodiment of the present invention.

In the embodiment illustrated in FIG. 6 the technique is used to monitor the inside of a conduit 500. One end of the conduit is sealed by a mirror 502. The other end of the conduit 500 receives the instrument 504. The efficiency of detection is increased as not only photons which are emitted towards the instrument 504, photons X, are detected, but also reflected photons from the mirror 502, photons Y, are detected.

Positional information on the source of the emissions is aided by the perspective the instrument 504 has when looking down the conduit 500.

Whilst the techniques described provide for the photons travelling directly to the detecting means more indirect routes can also be successfully used. Where access is limited or monitoring within highly active environments is under consideration it may be desirable to avoid introducing the main part of the instrument into the environment. By introducing a fibre optic into the environment photons can be collected and conveyed some distance to the detecting means where they are processed in the manner outlined above. The path from the collection point to the detecting means can be tortuous and yet provide successful detection. By providing direction control over the collection end of the fibre optics directional analysis can still be performed. The collection system may also provide for a visual inspection, for instance through a parallel fibre to the scintillation collection fibre(s).

The detection capacity of the instruments of the present invention may be provided alongside addition detection capacities, for instance of gamma and/or beta emissions. Scintillators may be used for this purpose.

Whilst nitrogen is the preferred scintillating gas, due to its low cost and ease of applicability, other gases such as the inert gases may be used.

The invention, in its various forms, offers an accurate monitoring technique which enables remote determinations to be made. The system is relatively simple, cost effective, light weight and portable, yet offers accurate investigations suitable for use in monitoring a wide variety of contaminated or potentially contaminated environments.

What is claimed is:

1. A method of monitoring emissions from one or more radioactive sources in an area, comprising the steps of presenting photon detecting means to the area to be monitored, the photon detecting means producing a signal indicative of photons detected, the signal being processed to produce an indication of the emissions from the radioactive source, the photons passing through a shield transparent to at least a part of the wavelengths of the photons to be detected prior to reaching the detecting means characterized in that the shield is transparent only to wavelengths between 220 nm and 320 nm, the shield blocking the passage of photons not associated with the emissions from the radioactive source thereby substantially eliminating a computational burden required to account for the photons not associated with the emissions from the radioactive source.

2. A method according to claim 1 in which the photons arise from scintillation caused by the emissions, the scintillations arising in the environment around the area.

3. A method according to claim 1 in which the range of wavelengths detected and/or considered is indicative of scintillation from a particular component of the environment around the area.

4. A method according to claim 3 in which the component is nitrogen in the air.

5. A method according to claim 1 in which the photons are detected by a light sensitive device, the light sensitive device being collimated.

6. A method according to claim 1 in which the processing converts the detected photons into an indication of emissions, the indication of emissions being a level of alpha emissions and/or beta emissions and/or gamma emissions and/or neutrons and/or fission fragments and/or positrons and/or N-alphas singularly and/or a level of overall emissions.

7. A method according to claim 1 in which the processing involves the subtraction of background scintillation from the signal, a second photon detecting means, receiving only background scintillations, being used to provide the subtraction signal.

8. A method according to claim 1 in which the processing generates positional information about the source of the signals.

9. An emission monitoring instrument comprising photon detection means and processing means, the photon detecting means produce a signal in response to photons, the processing means act on the signal to give an indication relating to the emissions, the instrument further comprises a shield transparent to at least a part of the wavelengths of the photons to be detected, the shield being positioned between the source and detecting means characterized in that the shield is transparent only to wavelengths between 220 nm and 320 nm, the shield blocking the passage of photons not associated with the emissions from the radioactive source thereby substantially eliminating a computational burden required to account for the photons not associated with the emissions from the radioactive source.

10. An instrument according to claim 9 in which the photons detected by the instrument arise from scintillation caused by the passage of alpha particles and/or beta particles and/or gamma rays and/or neutrons and/or fission fragments and/or positrons and/or N-alphas from radioactive species.

11. An instrument according to claim 9 in which the photon detecting means are selective to certain wavelengths or wavebands and the selective waveband is one not containing photons arising from the ambient light conditions for the area.

12. An instrument according to claim 11 which is provided with a shield to block ambient light wavelengths from detection.

13. An instrument according to claim 9 in which the instrument includes a range finder to indicate the distance between the photon detecting means and one or more locations within the area/environment.

14. A method of monitoring emissions from one or more radioactive sources in an area, comprising:

providing a photon detecting device to the area being monitored;

providing a shield that is transparent only to at least a part of the wavelengths of the photons to be detected such that most of the detected photons are only associated with the emissions of the radioactive sources thereby substantially reducing a computational burden required to account for those photons not associated with the radioactive source;

generating a signal indicative of the detected photons; and processing the signal to produce an indication of the emissions from the radioactive source.

15. A method according to claim 14 wherein, the indication of emissions being a level of alpha emissions and/or beta emissions and/or gamma emissions and/or neutrons and/or fission fragments and/or positrons and/or N-alphas singularly and/or a level of overall emissions.

16. A method according to claim 14, wherein the wavelengths of the detected photons are less than approximately 320 nm and greater than approximately 220 nm.

* * * * *